United States Patent
Loce et al.

(10) Patent No.: US 6,606,420 B1
(45) Date of Patent: Aug. 12, 2003

(54) METHOD AND APPARATUS FOR DIGITAL IMAGE DARKNESS CONTROL IN SATURATED IMAGE STRUCTURES

(75) Inventors: Robert P. Loce, Webster, NY (US); Clara Cuciurean-Zapan, Fairport, NY (US); Yeqing Zhang, Penfield, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/425,951

(22) Filed: Oct. 25, 1999

(51) Int. Cl.[7] .................................................. G06K 9/40
(52) U.S. Cl. ........................ 382/266; 382/269; 382/199
(58) Field of Search ................................. 382/199, 254, 382/266, 258, 269, 256, 205; 358/2.99, 3.01, 3.03, 3.27

(56) References Cited

U.S. PATENT DOCUMENTS

| | | | |
|---|---|---|---|
| 4,460,909 A | 7/1984 | Bassetti et al. | 346/160 |
| 4,544,264 A | 10/1985 | Bassetti et al. | 355/14 R |
| 4,625,222 A | 11/1986 | Bassetti et al. | 346/160 |
| 5,091,971 A | 2/1992 | Ward et al. | 382/54 |
| 5,128,698 A | 7/1992 | Crawford et al. | 346/160 |
| 5,282,057 A | 1/1994 | Mailloux et al. | 358/445 |
| 5,359,423 A | 10/1994 | Loce | 358/296 |
| 5,387,985 A | 2/1995 | Loce et al. | 358/447 |
| 5,483,351 A | 1/1996 | Mailloux et al. | 358/298 |
| 5,555,557 A | 9/1996 | Mailloux | 382/299 |
| 6,137,918 A | * 10/2000 | Harrington et al. | 382/269 |
| 6,381,035 B1 | * 4/2002 | Zhang et al. | 358/1.9 |
| 6,501,565 B1 | * 12/2002 | Karidi et al. | 382/266 |

OTHER PUBLICATIONS

Copy of Chapter 1 of the book "Enhancement and Restoration of Digital Documents: Statistical design of nonlinear algorithms" by R. Loce & E. Dougherty, SPIE Optical Engineering Press (1997).
Copy of article entitled "Improved Output Quality by Modulating Recording Power," authored by J. L. Crawford and C. D. Elzinga and presented at the SPSE 41st Annual Conference, May 22–26, 1988 in Arlington, Virginia.

\* cited by examiner

*Primary Examiner*—Phuoc Tran
(74) *Attorney, Agent, or Firm*—Mark Costello

(57) ABSTRACT

A method and apparatus for the control of darkness/lightness in a digital image rendered by a printing system. An original image containing antialiased edges is initially thresholded and filtered to determine an edge map. With knowledge of the edge via the edge map, darkness adjustment is applies to the digital image. Gray-edge compaction is applied thereafter to adjust the position of the edge.

8 Claims, 5 Drawing Sheets

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 0 | 0 | 0 | 0 | 0 | 0 | 0 | 0 | 0 |
| 143 | 15 | 0 | 0 | 0 | 0 | 0 | 0 | 0 | 0 | 0 | 0 | 0 |
| 255 | 239 | 111 | 0 | 0 | 0 | 0 | 0 | 0 | 0 | 0 | 0 | 0 |
| 255 | 255 | 255 | 207 | 63 | 0 | 0 | 0 | 0 | 31 | 95 | 159 | 239 |
| 223 | 255 | 255 | 255 | 255 | 175 | 79 | 143 | 223 | 255 | 255 | 255 | 255 |
| 15 | 255 | 255 | 255 | 255 | 255 | 255 | 255 | 255 | 255 | 255 | 255 | 255 |
| 175 | 255 | 255 | 255 | 255 | 255 | 255 | 255 | 255 | 255 | 255 | 255 | 15 |
| 255 | 255 | 255 | 255 | 255 | 255 | 255 | 255 | 255 | 255 | 255 | 255 | 0 |
| 255 | 255 | 191 | 127 | 47 | 0 | 95 | 239 | 255 | 255 | 255 | 255 | 159 |
| 79 | 15 | 0 | 0 | 0 | 0 | 0 | 15 | 127 | 255 | 255 | 255 | 255 |
| 0 | 0 | 0 | 0 | 0 | 0 | 0 | 0 | 0 | 31 | 191 | 255 | 255 |
| 0 | 0 | 0 | 0 | 0 | 0 | 0 | 0 | 0 | 0 | 0 | 63 | 223 |
| 0 | 0 | 0 | 0 | 0 | 0 | 0 | 0 | 0 | 0 | 0 | 0 | 0 |

*FIG. 3*

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 0 | 0 | 0 | 0 | 0 | 0 | 0 | 0 | 0 |
| 255 | 255 | 0 | 0 | 0 | 0 | 0 | 0 | 0 | 0 | 0 | 0 | 0 |
| 255 | 255 | 255 | 0 | 0 | 0 | 0 | 0 | 0 | 0 | 0 | 0 | 0 |
| 255 | 255 | 255 | 255 | 255 | 0 | 0 | 0 | 0 | 255 | 255 | 255 | 255 |
| 223 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 0 |
| 255 | 255 | 255 | 255 | 255 | 0 | 255 | 255 | 255 | 255 | 255 | 255 | 255 |
| 255 | 255 | 0 | 0 | 0 | 0 | 0 | 255 | 255 | 255 | 255 | 255 | 255 |
| 0 | 0 | 0 | 0 | 0 | 0 | 0 | 0 | 0 | 255 | 255 | 255 | 255 |
| 0 | 0 | 0 | 0 | 0 | 0 | 0 | 0 | 0 | 0 | 0 | 255 | 255 |
| 0 | 0 | 0 | 0 | 0 | 0 | 0 | 0 | 0 | 0 | 0 | 0 | 0 |

*FIG. 4*

| 0 | 0 | 0 | 0 | 0 | 0 | 0 | 0 | 0 | 0 | 0 | 0 | 0 |
|---|---|---|---|---|---|---|---|---|---|---|---|---|
| 255 | 255 | 0 | 0 | 0 | 0 | 0 | 0 | 0 | 0 | 0 | 0 | 0 |
| 0 | 0 | 255 | 0 | 0 | 0 | 0 | 0 | 0 | 0 | 0 | 0 | 0 |
| 0 | 0 | 0 | 255 | 255 | 0 | 0 | 0 | 0 | 255 | 255 | 255 | 255 |
| 0 | 0 | 0 | 0 | 0 | 255 | 255 | 255 | 255 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 255 | 0 | 0 | 0 | 0 | 0 | 0 | 0 |
| 0 | 0 | 255 | 255 | 255 | 0 | 255 | 0 | 0 | 0 | 0 | 0 | 0 |
| 255 | 255 | 0 | 0 | 0 | 0 | 0 | 255 | 255 | 0 | 0 | 0 | 0 |
| 0 | 0 | 0 | 0 | 0 | 0 | 0 | 0 | 0 | 255 | 255 | 0 | 0 |
| 0 | 0 | 0 | 0 | 0 | 0 | 0 | 0 | 0 | 0 | 0 | 255 | 255 |

FIG. 5

| 0 | 0 | 0 | 0 | 0 | 0 | 0 | 0 | 0 | 0 | 0 | 0 | 0 |
|---|---|---|---|---|---|---|---|---|---|---|---|---|
| 128 | 128 | 0 | 0 | 0 | 0 | 0 | 0 | 0 | 0 | 0 | 0 | 0 |
| 143 | 15 | 128 | 0 | 0 | 0 | 0 | 0 | 0 | 0 | 0 | 0 | 0 |
| 255 | 239 | 111 | 128 | 128 | 0 | 0 | 0 | 0 | 128 | 128 | 128 | 128 |
| 255 | 255 | 255 | 207 | 63 | 128 | 128 | 128 | 128 | 31 | 95 | 159 | 239 |
| 223 | 255 | 255 | 255 | 255 | 175 | 79 | 143 | 223 | 255 | 255 | 255 | 255 |
| 15 | 127 | 255 | 255 | 255 | 255 | 255 | 255 | 255 | 255 | 255 | 255 | 255 |
| 175 | 239 | 255 | 255 | 255 | 255 | 255 | 255 | 255 | 255 | 159 | 95 | 15 |
| 255 | 255 | 255 | 255 | 255 | 255 | 255 | 255 | 255 | 255 | 191 | 63 | 128 |
| 255 | 255 | 191 | 127 | 47 | 128 | 95 | 255 | 255 | 255 | 255 | 255 | 159 |
| 79 | 15 | 128 | 128 | 128 | 0 | 128 | 15 | 127 | 255 | 255 | 255 | 255 |
| 128 | 128 | 0 | 0 | 0 | 0 | 0 | 128 | 128 | 31 | 191 | 255 | 255 |
| 0 | 0 | 0 | 0 | 0 | 0 | 0 | 0 | 128 | 128 | 63 | 223 |
| 0 | 0 | 0 | 0 | 0 | 0 | 0 | 0 | 0 | 0 | 0 | 128 | 128 |

FIG. 6

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 0 | 0 | 0 | 0 | 0 | 0 | 0 | 0 | 0 |
| 48 | 0 | 0 | 0 | 0 | 0 | 0 | 0 | 0 | 0 | 0 | 0 | 0 |
| 255 | 0 | 0 | 0 | 0 | 0 | 0 | 0 | 0 | 0 | 0 | 0 | 0 |
| 255 | 254 | 255 | 64 | 0 | 0 | 0 | 0 | 0 | 0 | 0 | 0 | 64 |
| 255 | 255 | 255 | 255 | 255 | 0 | 0 | 0 | 16 | 255 | 223 | 255 | 255 |
| 223 | 255 | 255 | 255 | 255 | 255 | 207 | 255 | 255 | 255 | 255 | 255 | 255 |
| 15 | 127 | 255 | 255 | 255 | 255 | 255 | 255 | 255 | 255 | 255 | 255 | 255 |
| 175 | 255 | 255 | 255 | 255 | 255 | 255 | 255 | 255 | 255 | 159 | 95 | 15 |
| 255 | 255 | 191 | 255 | 255 | 255 | 255 | 255 | 255 | 255 | 191 | 63 | 128 |
| 255 | 255 | 255 | 255 | 175 | 128 | 223 | 239 | 255 | 255 | 255 | 255 | 174 |
| 207 | 207 | 0 | 0 | 0 | 0 | 0 | 143 | 255 | 255 | 255 | 255 | 255 |
| 0 | 0 | 0 | 0 | 0 | 0 | 0 | 0 | 0 | 159 | 255 | 255 | 255 |
| 0 | 0 | 0 | 0 | 0 | 0 | 0 | 0 | 0 | 0 | 0 | 255 | 255 |

FIG. 7

METHOD AND APPARATUS FOR DIGITAL IMAGE DARKNESS CONTROL IN SATURATED IMAGE STRUCTURES

The present invention relates generally to the control of darkness/lightness in a digital image printing system, and more particularly to identification of saturated image structures requiring darkness/lightness modification within a digital image and alteration of such structures to control perceived darkness/lightness of the output image.

BACKGROUND OF THE INVENTION

Darkness/lightness control is a feature commonly known to be employed in xerographic reproduction systems. Specifically, it is well known to control the darkness/lightness of an output document by altering the xerographic processes employed to generate and deposit an image on a substrate. However, such changes to the xerographic process were often imperfectly applied over an entire document, leading to user dissatisfaction, or were particularly problematic for the xerographic system, often resulting in reduced life of the xerographic components and supplies. More recently however, there have been processes that have been described for accomplishing darkness/lightness control in a digital printing system, wherein control is accomplished by directly controlling the image exposure system rather than by indirectly controlling the amount of marking material deposited upon an image substrate. The present invention takes advantage of the improved reliability and resolution of digital image printing systems to accomplish real-time processing of digital image data to alter image data in accordance with a user-specified darkness/lightness level in a document image.

However, in the past, darkness/lightness digital imaging processes have been directed to binary input, and not to now-expected, gray scale input. Additionally, a substantial portion of the gray scale input will have been previously subjected to antialiasing processes, designed to reduce jaggies through the addition of selectively applied gray pixels. In addition, scanned halftone images and gray halftones from various sources present a similar need. That is, an image structure with some darkened central region may possess a gray edge, and it is desirable to give that image structure a darker or broader appearance.

Heretofore, a number of patents and publications have disclosed bitmap image processing methods, including U.S. Pat. No. 4,460,909, U.S. Pat. No. 4,544,264, and U.S. Pat. No. 4,625,222 to Bassetti; U.S. Pat. No. 5,091,971 to Ward et al.; U.S. Pat. No. 5,282,057 to Mailloux et al.; U.S. Pat. No. 5,359,423 to Loce; U.S. Pat. No. 5,387,985 to Loce et al.; U.S. Pat. No. 5,483,351 to Mailloux et al.; U.S. Pat. No. 5,555,557 to Mailloux. Also noted is U.S. patent application Ser. No. 09/072,122 by Loce et al., entitled, "Method and Apparatus for Digital Image Darkness Control using Quantized Fractional Pixels" U.S. Pat. No. 5,128,698 to Crawford et al. employs control of the illumination intensity at edge pixels to control placement of image edges.

The book "Enhancement and Restoration of Digital Documents: Statistical design of nonlinear algorithms" by R. Loce & E. Dougherty, SPIE Optical Engineering Press (1997) also describes template-based morphological operations as applied to image bitmaps. The relevant portions of the publication are hereby incorporated by reference.

Crawford, J. L. and C. D. Elzinga, "Improved Output Quality by Modulating Recording Power," SPSE 41st Annual Conference, May 22–26, 1988 Arlington Va., describes logic mask techniques to smooth bit map images while dilating image structures. Power modulation of the laser is employed.

The references cited herein are incorporated by reference for their teachings.

SUMMARY OF THE INVENTINON

The present invention is directed to a darkness control for adjusting darkness of certain image structures, using morphological processing.

In accordance with the present invention, there is provided a process for control of darkness/lightness in a digital image containing antialiased line art, including: detecting borders within images to be adjusted; adjusting darkness of said detected borders in accordance with desired results; and compacting diffuse gray formed at said borders.

In accordance with another aspect of the invention, detection of borders includes thresholding digital images to be adjusted to remove gray areas, subsequently identifying black/white transitions as borders, and designating as a border pixel any white pixel with a black neighboring pixel after thresholding.

In accordance with still another aspect of the invention, darkness adjustment includes assigning a desired amount of darkness, in the form a gray value onto the detected border pixels.

In accordance with yet another aspect of the invention, said gray compaction includes shifting gray from a first pixel that is not adjacent to a saturated pixel to a second pixel that is adjacent to a saturated pixel; and updating a pixel value in response to said shifting.

The present invention may be applied to similar forms of gray-edged image structures such as halftone dots, and in that setting a change in tone would be perceived. The invention also has particular value in providing a method of adjusting darkness on antialiased line art, so as not to disrupt existing antialiasing. The process is a combination of logical processes that provide a robust system applicable to a large number of cases.

BRIEF DESCRIPTION OF THE DRAWINGS

FIGS. 3–7 together form a set of numerical examples corresponding to the illustrative example.

DESCRIPTION OF THE PREFERRED EMBODIMENT

Figure 1:
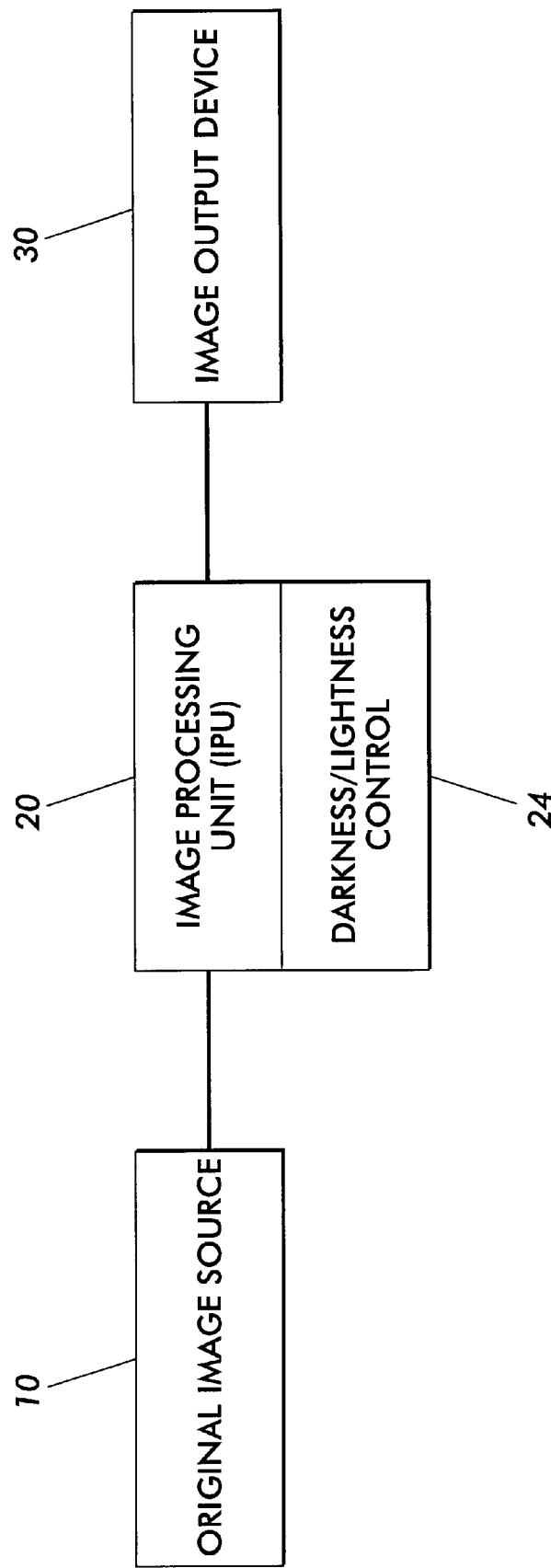
FIG. 1 is a block diagram of a digital printing system in which the present invention may find use.

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

A "multi-bit" item of data is an item of data that includes more than one bit. A multi-bit item of data has a "uniform value in all of its bits" or a "uniform value in all bits" when every bit in the data item has the same value, either ON or OFF. Multibit values are commonly used to represent gray pixels "Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs and programmable delay lines.

A "data processing system" is a physical system that processes data. A "data processor" or "processor" is any component or system that can process data, and may include one or more central processing units or other processing components. An "image processor" is a processor specifically designed to process data representing an image. An operation performs "image processing" when it operates on an item of data that relates to part of an image.

An "image" is a pattern of physical light. An image may include characters, words, and text as well as other features such as graphics. A text may be included in a set of one or more images, such as in images of the pages of a document. An image may be divided into "segments," each of which is itself an image. A segment of an image may be of any size up to and including the whole image. A "digital image" may be to be a collection of "data" representing an image. An item of data "defines" or "represents" an image when the item of data includes sufficient information to produce the image. For example, a two-dimensional array or bitmap can define all or any part of an image, with each item of data in the array or bitmap providing a value indicating the color of a respective location of the image.

A "pixel" is the smallest segment into which an image is divided in a given system. In an array defining an image in which each item of data provides a value, each value indicating the color of a location may be called a "pixel value". Each pixel value is a bit in a "binary form" of an image, a gray-scale value in a "gray-scale form" of an image, or a set of color-space coordinates in a "color-coordinate form" of an image, the binary form, gray-scale form, and color-coordinate form each being a two-dimensional array is defining a digital image. An "image input device" is a device that can receive an image and provide an item of data defining a version of the image. A "scanner" is an image input device that receives an image by a scanning operation, such as by scanning a document.

An "image output device" is a device that can receive an item of data defining an image and provide the image as output. A "display" and a "printer" are examples of image output devices that provide the output image in a human viewable form.

The "darkness" of an image is the inverse of the perceived level of "lightness" for light reflected from the image and/or the substrate on which it is rendered. The term "darkness" is employed as an indication of the quality of an image. Darkness (lightness) is typically represented along a continuum spanning the range from white to black. The perceived darkness of a printed line segment is a function of the average line density and the line width. It will be appreciated by those skilled in the art of xerography that line density may be controlled by altering the xerographic process controls while line width is controlled by the size of the region exposed on a photoresponsive member used to form a latent image. Accordingly, control of the darkness of an image may be implemented via modification of the line (structure) width—a process that is adaptable to digital images as well.

A basic system for carrying out the present invention is shown in FIG. 1. In such a system, a source of original images 10, perhaps an image input device, such as a scanner (color or black and white) or digital camera, a personal computer, workstation or other data processing system with appropriate document or image creation software, a data storage device, produces an image, typically in a device independent manner, provides suitable electronic images. The images are defined in pixels, each associated with at least one density or intensity level, depending on whether it is color or black and white.

An image from image data source 10 is directed to an image processing unit (IPU) 20, which, for the purposes of description includes all of the digital processing requirements to covert an image from its original data representation to a format suitable for printing at image output 30. Depending on the image representation, image decomposition from a PDL, halftoning from gray level images, antialiasing, color transforms, scaling and any other process required, is represented by the IPU 20. IPU 20 can take various forms and operational details, and ranges from dedicated, and hard wired or software driven operation in conjunction with high speed printing devices, to printer drivers running on personal computers or workstations driving personal printers. Called out particularly is the darkness control function 24, further described below.

Image output device 30 can be any printer, printing black and white or color, with corresponding numbers of separations, or an image display device.

Darkness control function 24 serves adjust the apparent darkness of images printed at the output display device. It does so by controlling thickness of lines and dots in the final image. Thicker lines or broader structures appear darker, and thinner lines or structures appear lighter. [Note that "line" is intended to refer to a structure within an image and should be considered to be a broad term]. Hence, broader structures appear darker than thinner structures.

The image darkness/lightness enhancement method and apparatus described herein may be generally outlined with the following process. Generally, the process comprises three steps: (a) detecting a border (either on an "inside" or "outside" of a structure; (b) applying darkness adjustment to border pixels of the structure; and (c) compacting any diffuse gray formed adjacent to an edges thereof. Note that the operations below possess equivalent representations that can differ from the mathematical form presented, but are intended to imply all logical equivalents of the operations.

While it is well within the invention to apply it to an entire image irrespective of the content thereof, initially, it will be assumed that the image includes line art. This may be because the user identify lines art as the critical element of the image to be reproduced, or because an image segmentation algorithm identified areas with line art, or because the image includes an object specifically identified, by a tag or PDL operator, when received, as including line art. Other ways of telling the system that line art is present may exist. In any case, the present invention assumes that line art, including lines, combinations of lines, and simple graphics objects, and text, are known to be present. For the purposes of this discussion, line art additionally refers to image structures that are primarily near saturation, but could also include other saturated structures like halftone dots. At a pixel level, scanning a halftone will yield a similar sort of image structure as scanning text, or antialiasing text. Hence, the present operators are well suited to modify darkness, broadness, and tones in all these related image types. When applied to text, the visual effect is a darkening or broadening of strokes. When applied to a grayed halftone, the effect would be a change in the local tone or density.

The step of identifying borders may conveniently comprise i) thresholding the image and ii) determining transitions from black to white. Thresholding process i) is used so that darker gray areas are set to black and lighter gray areas are set to white. Thus, there are no gray levels for midrange interpretation. Edges are found by looking at the image with a small window, and setting any white pixel adjacent to a black pixel to be an edge pixel, or conversely, setting any black pixel adjacent to a white pixel to be an edge pixel. Typically, when adding darkness, it is convenient to identify the white pixels as the edge and subsequently make them darker. In that setting, a threshold value near the white level is typically used. When making an image lighter it is convenient to identify black pixels as the edge and subsequently make them lighter. In that setting, a threshold value near the black level is typically used. Other edge detection processes may be used, and other edge identification processes may be used.

Once a border region to be adjusted is identified, (ii) determines darkness variation to be applied along the border region. Generally, this can be accomplished by logically assigning, or ORing or ADDing, desired amounts of gray into the identified border pixels making up the border region. For darkness addition, the input values of the affected pixels are white or perhaps near white, which are defined as zero for the present discussion. Hence overloading a pixel value beyond its range (typically 255, in an 8 bit imaging system) is unlikely for reasonable degrees of darkness addition. Larger additions can be accommodated if necessary using a method such as increasing the number of bits per pixel during the addition step, then accounting for these excessively large pixels values when diffusing darkness in the subsequent edge compaction stage by compacting or diffusing to achieve allowed gray levels. Also, the out-of range problem can occur when lightening the image, and conceptually a pixel with a large amount of darkness subtraction could go below zero in value and would require a similar diffusion of compaction. Note that defining white as zero and black as 255 is arbitrary and the opposite relation is equally valid. Similarly, darkening and lightening are conceptually similar and possess certain opposite characteristics. Both definitions are within the scope of the invention.

After determining the treatment to be applied along the border region, the border has gray values in varying amounts therealong. Gray edge compaction is applied, perhaps as described in U.S. patent application Ser. No. 09/17,035, filed Dec. 21, 1998, by Zhang et al. and entitled, "Edge Compaction in Antialiased Images". That application, assigned to the same assignee as the present invention and incorporated herein by reference, describes a method to compact a diffuse gray edge that is, for example, two-pixels wide to a condition where it is one-pixel wide so that it may be well rendered in a subsequent marking or display device. The method utilizes an observation window within continuous-tone image data to identify edge structure. The method then operates on the pixels within the observation window by: compacting horizontal features within the observation window; compacting vertical features within the observation window; and compacting corner features within the observation window. More particularly, as the window passes over each pixel, if a pixel is within a diffuse edge, gray is shifted from a first pixel (A) that is not adjacent to a saturated pixel to a second pixel (B) that is adjacent to a saturated pixel. Pixel values are updated accordingly, in response to the shifting step. The gray-edge compaction process is mathematically represented by $$B'=\min(255, B+A)$$

$$A'=A-[\min(255, B+A)-B]=A-B'+B$$

wherein A' and B' are the values of said first and second pixels after shifting gray.

Figure 2:
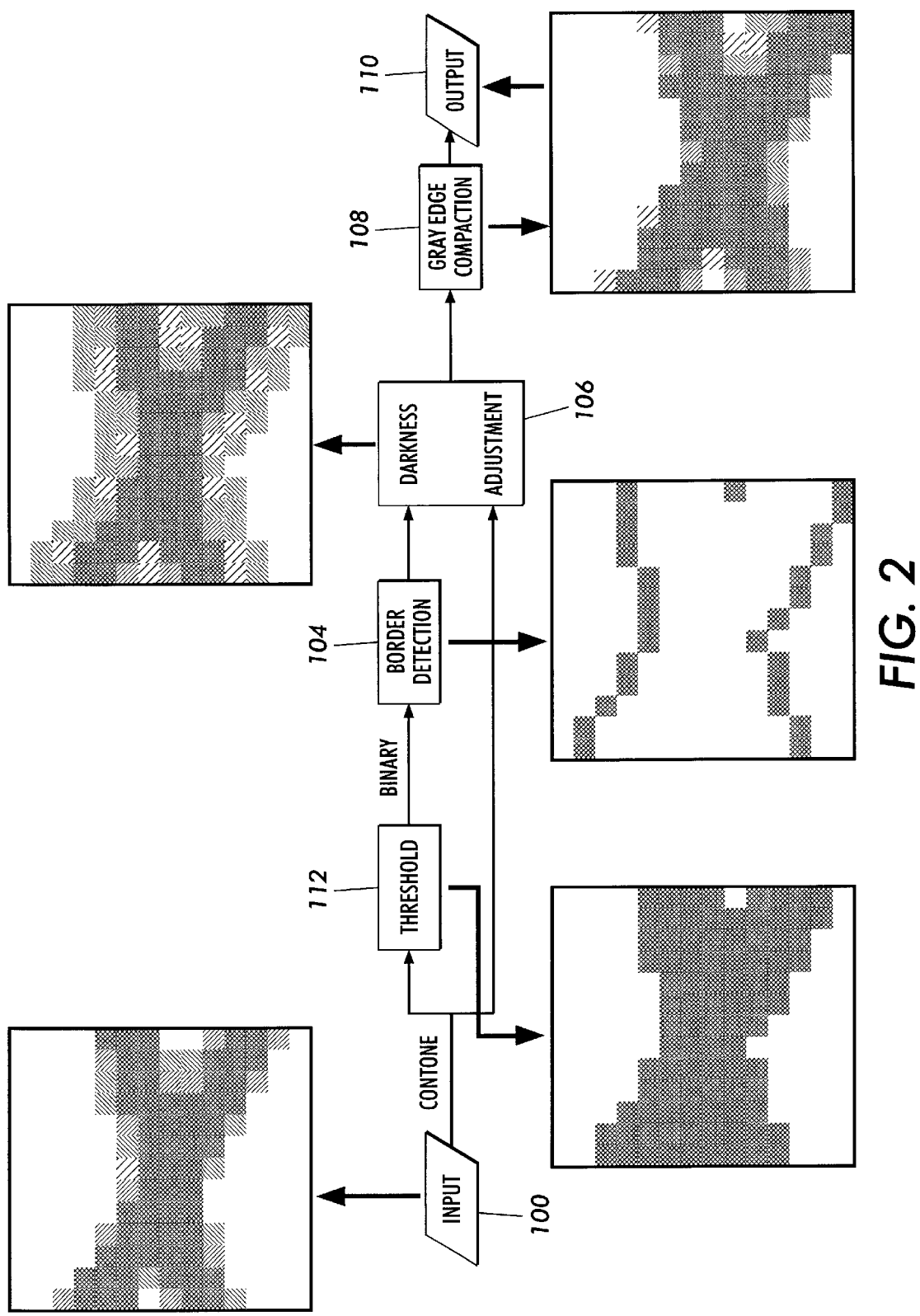
FIG. 2 is a somewhat schematic block diagram illustrating the inventive method of darkness control for antialiased text, with insets showing an illustrative example of a highly magnified region of an input image and corresponding image regions processed in accordance with the present invention.

With reference now to FIG. 2, a somewhat schematic block diagram of a circuit accomplishing the invention illustrates signal flow, while at the same time, showing the implications of the processing on an antialiased object edge. A signal input 100 received data from another source, probably from another image processing function in IPU 20 (FIG. 1). Once again, an assumption is made that antialiased line art is received. FIG. 2 provides an attached illustrative example of such an image received at input 100. FIG. 3 shows actual gray-level values for the image of FIG. 2. Note the range of gray values provided varies from "0" (white in the example) to 255 (black) and includes many values in between. Note that because added gray is properly compacted into the edge at a later state, the border detection step determined where to add gray that can be accessed by the gray compaction process. The location of the added gray need not be very precise, and so the border detection algorithm can be quite simple.

The image structure to be altered is passed to threshold processor 102, where darker gray areas are set to black and lighter gray areas are set to white. Thus, there are no gray levels for midrange interpretation. The inset image shows no gray areas remaining. Accordingly, Figure shows that the remaining values, which are either 0 or 255.

After thresholding, the thresholded image is passed to border detection 104. Generally, edges are found by looking at each pixel in the image with a small window including at least the adjacent pixels. For each white pixel, which has a black pixel adjacent thereto, an edge is defined, and an edge map is created. The connected inset from FIG. 2 shows a line defining the border pixels. Reference to FIG. 5 shows that "zero" values at edges have been converted to "black" values (255, in the example) at the edges, in each location where a white pixel had an adjacent black pixel, creating an outside border image. While this description applies to increasing darkness, it will no doubt be appreciated that increasing lightness operates in the converse: if a lighter image is desired an inside border image is created; at locations where a black pixel has an adjacent white pixel, the black pixel is defined as the border pixel.

Optionally, a logical process can be used that recognizes pixels at intersections, which could receive too much gray, and therefore can be removed. Of course, the threshold can be adjusted to vary the final position of the edge and the edge detection method could be optimized with respect to certain features that may require special treatment, such as inside and outside corners. For instance, special edges, such as inside and outside corners may receive a special designation from the edge detection algorithm, and the subsequent darkness adjustment step could utilize values that are optimized for these special edge features.

Next, the edge map is passed to darkness adjustment 106. Darkness adjustment also receives the unprocessed image, from input 100. With knowledge of the edge map, darkness adjustment operates on each pixel in the edge map to set darkness to a desired state. Each edge pixel is modified by, assigning, or ORing or ADDing thereto desired amounts of gray into the identified border pixels. See, FIG. 6

Subsequent to modifying each pixel, edge compaction 108 is provided, The process identifies an observation window within continuous tone image data (as passed thereto from darkness adjustment 106). The method then operates on the pixels within the observation window by: compacting horizontal features within the observation window; compacting vertical features within the observation window; and compacting corner features within the observation window. More particularly, as the window passes over each pixel, if the pixel is within a diffuse edge; gray is shifted from a first pixel (A) that is not adjacent to a saturated pixel to a second pixel (B) that is adjacent to a saturated pixel; and pixel values are updated accordingly, in response to the shifting step. The process is mathematically represented by $$B' = \min(255, B+A)$$

$$A' = A - [\min(255, B+A) - B] = A - B' + B$$

wherein A' and B' are the values of said first and second pixels after shifting gray. FIG. 6 shows the compaction process. Figure shows that a value of 128 has been ADDed to all the outside border pixels, which could be interpreted as adding half of a saturated pixel value to an edge. That is, the edge would be darkened by half a pixel in this example. The gray edges of Figure were 1-pixel wide, and the addition step creates edges that are 2-pixels wide, as shown in FIG. 3D. The compact step yields darkened edges that are 1-pixel wide, as shown in FIG. 7. With reference again to FIG. 2, the image may then be directed to an output 110, with values as per FIG. 7.

It will no doubt be appreciated that the present invention can be accomplished through application software accomplishing the functions described, to operate a digital computer or microprocessor, through a hardware circuit, which will probably provide optimum speed, or through some combination of software and hardware.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of altering a darkness level of a digital image, comprising the steps of:

receiving a set of image signals including gray edges;

isolating, within said set, said gray edges and generating an edge map therefrom;

using the edge map, varying gray by a selected amount at the edge of said image, so as to change the output level of at least one pixel along the border region; and compacting diffuse gray values at edges of said image, to minimize gray pixels at said edges.

2. The method as defined in claim 1, wherein said method of isolating said antialiased edges includes:

thresholding said image; and filtering said thresholded image to identify each pixel of a first state with a neighbor having a second state.

3. The method as defined in claim 1, wherein said varying gray to the edge of said image includes logically adding gray values representing an increase or decrease adjustment in desired darkness.

4. The method as defined in claim 1, wherein said compacting diffuse gray values includes:

logically shifting gray from a first pixel to a second pixel in towards a darker edge, whereby diffuse gray is minimized.

5. The method as defined in claim 4, wherein said logical shifting of includes:

utilizing an observation window within gray-level pixels generated by applying a selected amount of gray to said edge;

compacting horizontal features within the observation window;

compacting vertical features within the observation window; and compacting corner features within the observation window, whereby gray is shifted from any first gray value pixel that is not adjacent to a saturated pixel to a second pixel that is adjacent to a saturated pixel.

6. The method as defined in claim 1, wherein said gray edge is produced as a result of an antialiasing process.

7. The method as defined in claim 1, wherein said gray edge is formed by at least one halftone dot, including a darkened central region central region and a lighter gray edge.

8. A digital darkness control system, for adjusting darkness/lightness of antialiased edges, including;

an image input, receiving images including gray edges;
   an antialiased edge detector identifying gray edges in said received images;
   darkness/lightness adjustment, responsive to user control, logically adjusting darkness and lightness by combining or removing gray at said edges
   gray edge compaction, minimizing diffuse gray edges and maintaining gray values at said edge; and
   an image output, outputting said darkness/lightness adjusted edges.

* * * * *